US008793542B2

(12) United States Patent
Deuri et al.

(10) Patent No.: US 8,793,542 B2
(45) Date of Patent: *Jul. 29, 2014

(54) CONTROLLING IPSEC OFFLOAD ENABLEMENT DURING HARDWARE FAILURES

(71) Applicant: International Business Machines Corporation, Armonk, NY (US)

(72) Inventors: Kokil K. Deuri, Bangalore (IN); Vishal R. Mansur, Hubli (IN); Arpana Prashanth, Bangalore (IN); Dilip K. Singh, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/860,558

(22) Filed: Apr. 11, 2013

(65) Prior Publication Data
US 2013/0232575 A1    Sep. 5, 2013

Related U.S. Application Data

(63) Continuation of application No. 13/297,620, filed on Nov. 16, 2011.

(51) Int. Cl.
*G06F 11/00*    (2006.01)

(52) U.S. Cl.
USPC ............................................. 714/708; 709/224

(58) Field of Classification Search
USPC ........... 713/151, 189; 726/1; 714/43, 708, 24; 709/224
See application file for complete search history.

(56) References Cited

U.S. PATENT DOCUMENTS

| 7,644,317 B1* | 1/2010 | Sajassi et al. .................. 714/43 |
| 7,779,272 B2 | 8/2010 | Lee |
| 7,783,880 B2* | 8/2010 | Pinkerton et al. ............. 713/151 |
| 7,975,180 B2* | 7/2011 | Sajassi et al. .................. 714/43 |
| 8,141,126 B2* | 3/2012 | Gearhart et al. .................. 726/1 |
| 2003/0200456 A1 | 10/2003 | Cyr et al. |
| 2010/0262859 A1 | 10/2010 | Fan |
| 2012/0102334 A1* | 4/2012 | O'Loughlin et al. ......... 713/189 |

OTHER PUBLICATIONS

Sun Microsystems, Inc., "Sun Crypto Accelerator 6000 Board User's Guide," Nov. 2006, pp. 1-184, Santa Clara, CA, US.

* cited by examiner

*Primary Examiner* — David Ton
(74) *Attorney, Agent, or Firm* — John D. Flynn; Gregory K. Goshorn; Greg Goshorn, P.C.

(57) ABSTRACT

Provided are techniques for receiving a packet transmitted in conjunction with a security association associated with Internet Protocol Security (IPSec); determining, based upon the security Association that the packet is faulty; incrementing a count corresponding to previous faulty packets received; determining that the count exceeds a threshold; and disabling IPSec accelerator hardware in response to the determining that the count exceeds the threshold.

7 Claims, 5 Drawing Sheets

CONTROLLING IPSEC OFFLOAD ENABLEMENT DURING HARDWARE FAILURES

CROSS-REFERENCES TO RELATED APPLICATIONS

The present application is a continuation and claims the benefit of the filing date of an application entitled, "Controlling IPSEC Offload Enablement During Hardware Failures" Ser. No. 13/297,620, filed Nov. 16, 2011, assigned to the assignee of the present application, and herein incorporated by reference.

FIELD OF DISCLOSURE

The claimed subject matter relates generally to network communication and, more specifically, to techniques for controlling Internet Protocol Security (IPSec) offloads in the event of a hardware failure.

SUMMARY

Provided are techniques for controlling IPSec offloads in the event of a hardware failure. IPSec is a hardware feature supported by many network adapters. Typically, an outgoing or incoming packet is encapsulated or de-capsulated, respectively, when the packet is transferred by the IP layer to IPSec. While the encapsulation/de-capsulation may be performed in software associated with a network adapter, IPSec offload enables encapsulation/de-capsulation to be performed in specifically designed hardware. Since every packet sent by IP may need IPSes, IPSec offload has the advantage of improving performance.

Provided are techniques for receiving a packet transmitted in conjunction with a security association associated with Internet Protocol Security (IPSec); determining, based upon the security Association that the packet is faulty; incrementing a count corresponding to previous faulty packets received; determining that the count exceeds a threshold; and disabling IPSec accelerator hardware in response to the determining that the count exceeds the threshold.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

Figure 1:
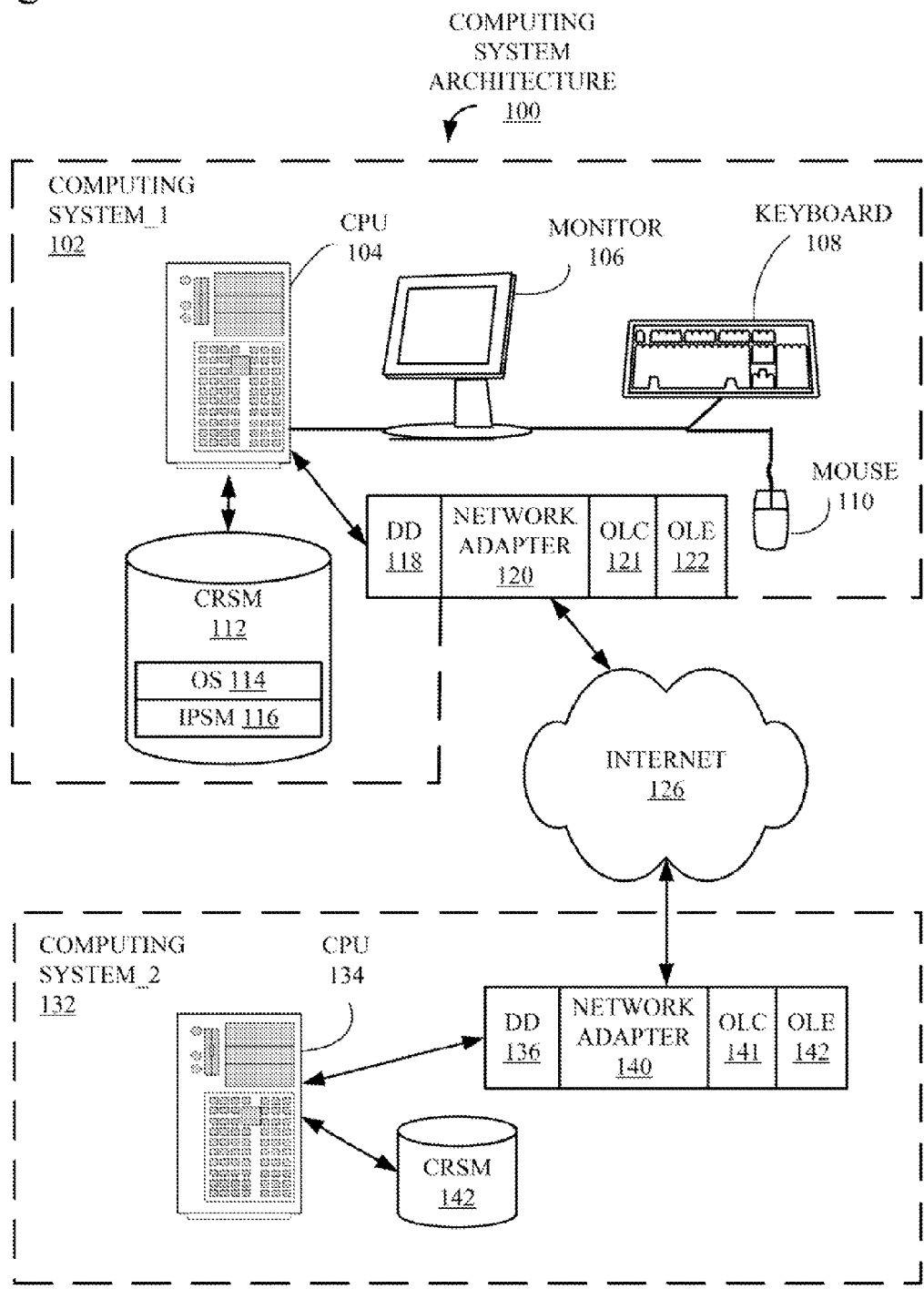
FIG. 1 is a block diagram of a computing system architecture that may implement the claimed subject matter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

If an IPSec offload feature is not operable on any particular hardware, there is currently no way for IPSec software on a corresponding network adapter to adapt and, therefore, all communication over IPSec fails. If an adapter does not support IPSec offload, a user is forced to turn off certain features such as Large Send and Checksum Offload on the adapter because segmentation and checksum recalculation cannot be done by the adapter on IPSec encapsulated packets.

Turning now to the figures. FIG. 1 is a block diagram of an example of a computing system architecture 100 that may incorporate the claimed subject matter. A computing system, i.e. a computing system_1 102, includes a central processing unit (CPU) 104, coupled to a monitor 106, a keyboard 108 and a pointing device, or "mouse," 110, which together facilitate human interaction with computing system 102.

Also included in computing system 102 and attached to CPU 104 is a computer-readable storage medium (CRSM) 112, which may either be incorporated into client system 102 i.e. an internal device, or attached externally to CPU 104 by means of various, commonly available connection devices such as but not limited to, a universal serial bus (USB) port (not shown). CRSM 112 is illustrated storing an operating system 114 that includes an Internet Protocol security module (IPSM) 116.

Computing system 102 also includes a device driver (DD) 118, as network adapter 120, an Offload Control module (OLC) 121 and an Offload engine (OLE) 122. Functionality associated with DD 118, network adapter 120, OLC 121 and OLE 122 is explained in more detail below in conjunction with FIGS. 2-5.

Client system 102 and CPU 104 are connected to the Internet 126, which is also connected to a second computing system, i.e. a computing system_2 132. Although in this example, client system_1 102 and computing system_2 122 are communicatively coupled via the Internet 126, they could also be coupled through any number of communication mediums such as, but not limited to, a local area network (LAN) (not shown). Computing system_2 132 includes a CPU 134, a DD 136, a network adapter 140, an OLC 141, an OLE 142 and a CRSM 142, like elements 104, 118, 120-122 and 112 of computing system_1 102, respectively. Typically, computing system_2 132 would also include a monitor, keyboard, mouse, OS and IPSM, which, for the sale of simplicity, are not shown. The elements of FIG. 1 and their relationship with the claimed subject matter are described in more detail below in conjunction with FIGS. 2-5. Further, it should be noted there are many possible computing system configurations, of which computing system architecture 100, computing system_1 102 and computing system_2 132 are only simple examples.

Figure 2:
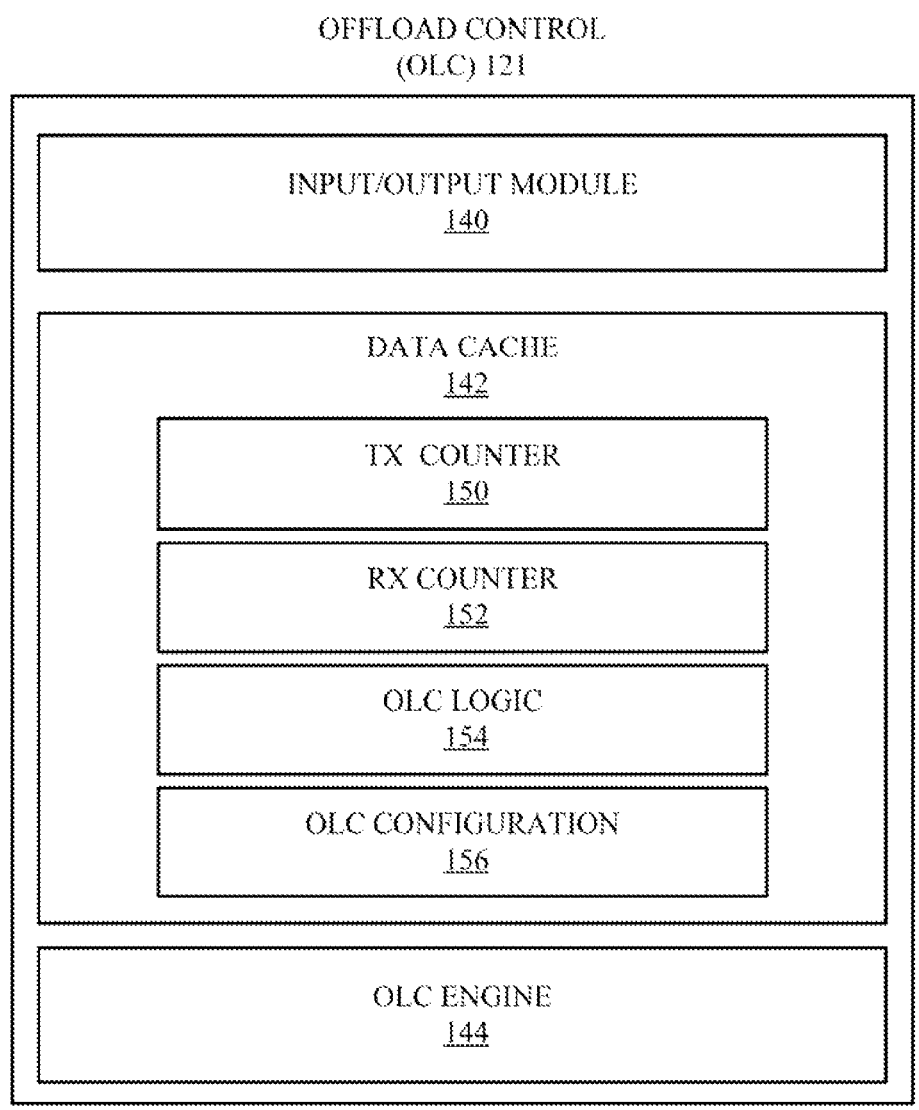
FIG. 2 is a block diagram of an Offload Control (OLC), first introduced in FIG. 1 in more detail.

FIG. 2 is a block diagram of OLC 121, first introduced in FIG. 1, in more detail. OLC 121 includes an input/output (I/O) module 140, a data cache component 142 and an OLC engine 144. For the sake of the following examples, OLC 121 is assumed to execute on hardware associated with computing system_1 102 (FIG. 1). It should be understood that the claimed subject matter can be implemented in many types of computing systems and data storage structures but, for the sake of simplicity, is described only in terms of computing system_1 102 and system architecture 100 (FIG. 1). Further, the representation of OLC 118 in FIG. 2 is a logical model. In other words, components 140, 142 and 144 may be stored in the same or separates files and loaded and/or executed within OLC 118 either as a single system or as separate processes interacting via any available inter process communication (IPC) techniques.

I/O module 140 handles communication between OLC 121 and other components of computing system_1 102. Data cache 142 is a data repository fir information, including but not limbed to logic and parameters, which OLC 121 requires during setup and normal operation. Examples of the types of information stored in data cache 142 include a transmission send (TX) counter 150, a transmission receive (RX) counter 152, OLC logic 154 and OLC configuration 156.

TX counter 150 and RX counter 152 are used to keep track of transmission and receive errors, respectively. OLC logic 154 includes logic for controlling the operation of OLC 121. Like other components of OLC 121, OLC logic 154 may be implemented as hardware, software or a combination of the two. OLC configuration 156 includes information on various operational preferences that have been set. For example, an administrator may set an upper limit on number of either TX or RX errors over a defined period of time that would cause OTC 118 to implement procedures to disable IPSec offloading in accordance with the claimed subject matter.

OLC engine 144 executes logic in OLC logic 154 under control of parameters stored in OLC configuration 156. Components 142, 144, 150, 152, 154 and 156 are described in more detail below in conjunction with FIGS. 3-5.

Figure 3:
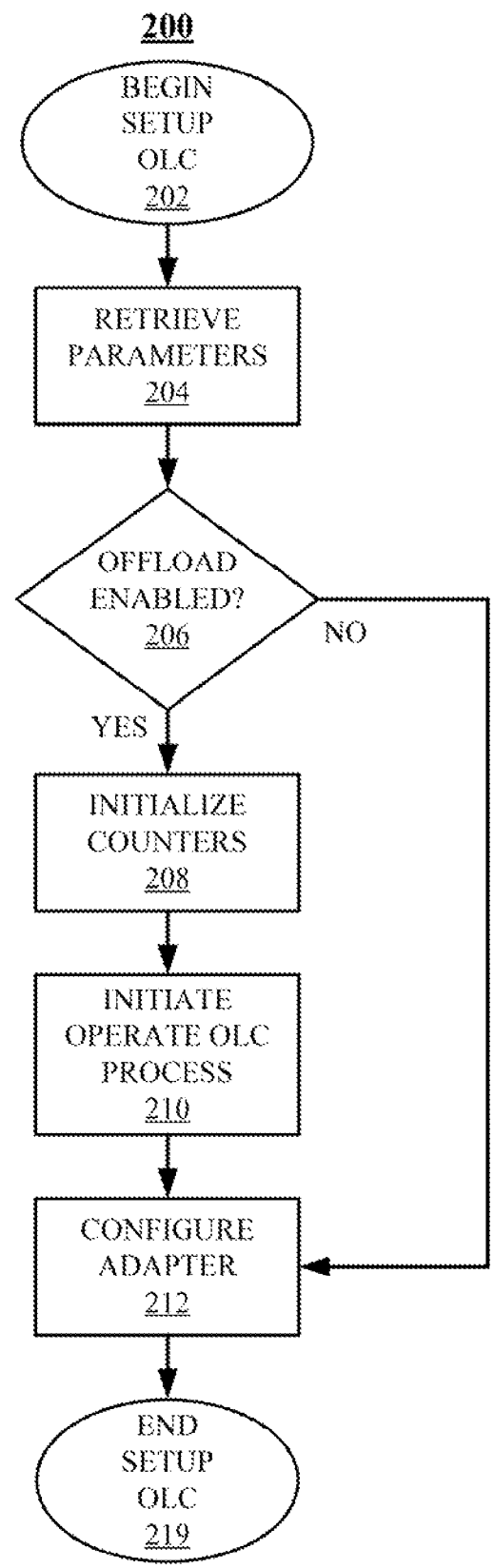
FIG. 3 is a flowchart of a Setup OLC process that may implement aspects of the claimed subject matter.

FIG. 3 is a flowchart of a Setup OLC process 200 that may implement aspects of the claimed subject matter. In this example, OLC process 200 is executed in conjunction with logic and memory associated with OLC 121 (FIGS. 1 and 2) and OLE 122 (FIG. 1). As explained above, process 200 may be implemented in hardware, software or a combination of the two and may comprise, but is not limited to, a standalone component in computing system_1 102 or be integrated into network adapter 120.

Process 200 starts in a "Begin Setup OLC" block 202 and proceeds immediately to a "Retrieve Parameters" block 204. During processing associated with block 204, various parameters that control the operation of an Operate OLC process (see 250, FIG. 4) are retrieved from memory (see 156, FIG.

2). During processing associated with an "Offload Enabled?" block 206, a determination is made as to whether or not network adapter 120 is capable of and configured to implement offloading of IPSec processing, including the encryption and decryption of designated packets. If so, control proceeds to an "Initialize Counters" block 208. During processing, associated with block 208 variables that control operation of OLC 121 are set to designated initial values based upon parameters retrieved during processing associated with block 204. Example of such variables include, but are not limited to, TX counter 150 and RC counter 152, which would both typically be set to an initial value equal to '0'.

Figure 4:
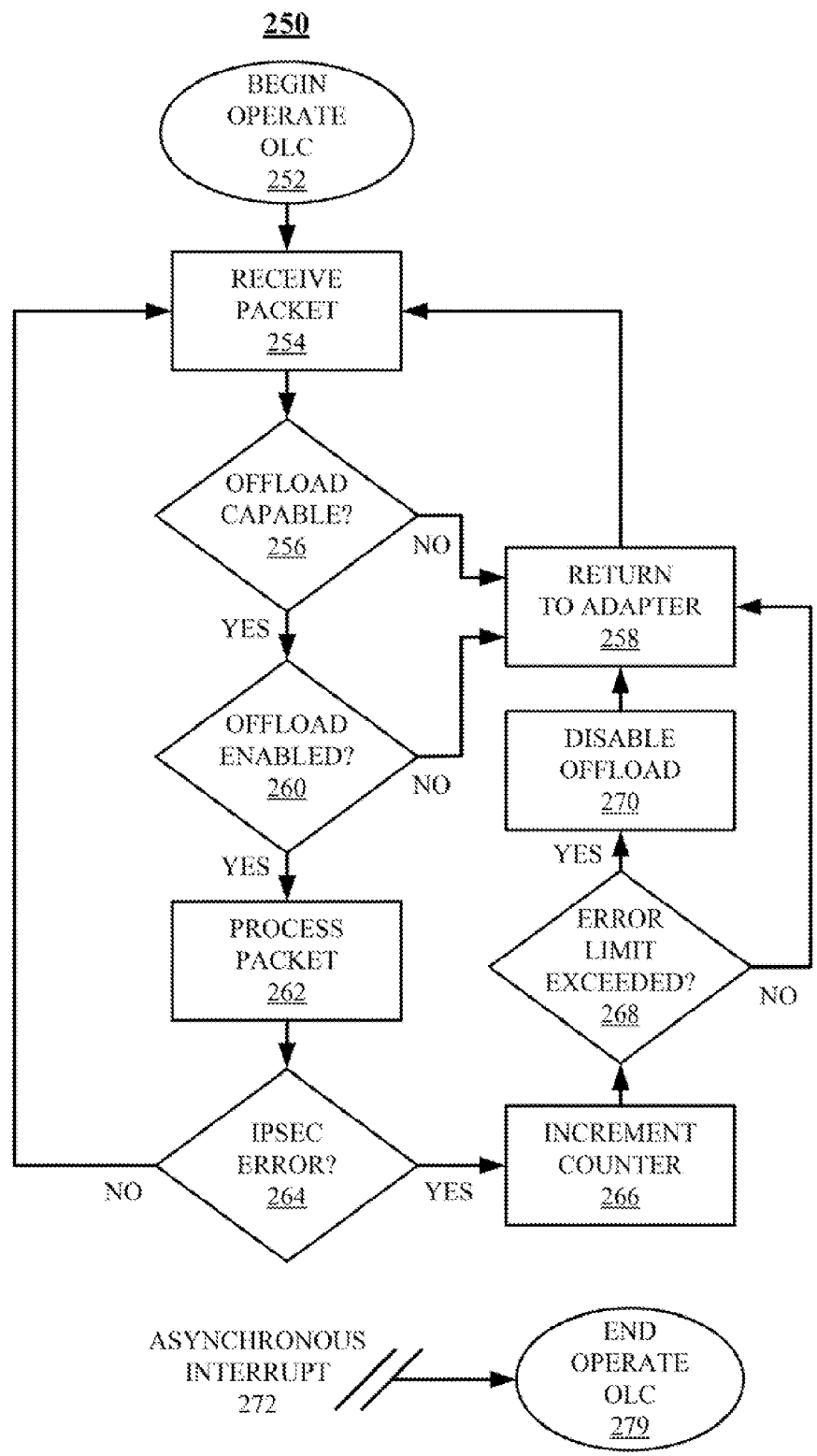
FIG. 4 is a flowchart of an Operate OLC process that may implement aspects of the claimed subject matter.

During processing associated with an "Initiate Operate OLC process" block 210, a process is initiated to handle the normal processing of OLC 121 (see 250, FIG. 4). Once normal processing of OLC 121 has been initiated during processing associated with block 210 or, if during processing associated with block 206 a determination has been made that IPSec offload processing has not been enable, control proceeds to a "Configure Adapter" block 212. During processing associated with block 212, network adapter 120 is appropriately configured, i.e. either to implement IPSec offloading or not depending upon whether control has been passed from block 212 or block 206, respectively. Finally, control proceeds to an "End Setup OLC" block 219 during which process 200 is complete.

FIG. 4 is an example of an Operate OLC process 250 that may implement aspects of the claimed subject matter. Like process 200 (FIG. 3), in this example, Operate OLC process 250 is executed in conjunction with logic and memory associated with OLC 121 (FIGS. 1 and 2) and OLE 122 (FIG. 1). As explained above, process 200 may be implemented in hardware, software or a combination of the two and may comprise, but is not limited to, a standalone component in computing system_1 102 or be integrated into network adapter 120.

Process 250 starts in a "Begin Operate OLC" block 252 and proceeds immediately to a "Receive Packet" block 254. During processing associated with block 254, a packet is received by network adapter 120 (FIG. 1). During processing associated with an "Offload Capable?" block 256, a determination is made as to whether or not network adapter 120 has IPSec offload functionality, or in other words, is configured to execute IPSec offloading. If not, control proceeds to a "Return to Adapter" block 258. During processing associated with block 258, the IPSec processing associated with the packet received during processing associated with block 254 is handled by network adapter 120 in a non-offloaded manner. Control then returns to Receive Packet block 254 during processing associated with the next packet is received and processed as described herein.

If, during processing associated with block 256, a determination is made that network adapter in offload capable, control proceeds to an "Offload Enabled?" block 260. During processing associated with block 260, a determination is made as to whether or not network adapter 120, which was determined to have IPSec offload functionality, is currently enabled to execute offload processing. If not, control proceeds to "Return to Adapter" block 258 and processing continues as described herein.

If, during processing, associated with block 260, a determination is made that network adapter in offload enabled, control proceeds to as "Process Packet" block 262. Block 262 is described in more detail below in conjunction with FIG. 5. During an "IPSec Error?" block 264 a determination is made as to whether or not there was an IPSec error in conjunction with the processing during processing associated with block 262. If not, control returns to Receive Packet block 254 during processing with the next packet is received and processed as described herein.

If, during processing associated with block 264, a determination is made that an IPSec error has occurred, control proceeds to an "Increment Counter" block 266. During processing associated with block 266, either a transmission counter or a receive counter (see 150, 152; FIG. 2) that maintain numbers of IPSec errors is incremented depending upon whether the error occurred on the outgoing or incoming side, respectively. Such counts may include a total number of errors or the number of errors within a selected time frame. In addition, in an alternative embodiment, only a single count of both outgoing and incoming errors may be maintained. During processing associated with an "Error Limit Exceeded?" block 268, a determination is made as to whether or not the count incremented during processing associated with block 268 now exceeds a predefined limit. As explained above in conjunction with FIG. 2, the number of errors that would exceed the limit depends upon various operational preferences that have been set. For example, an administrator may set an upper limit on number of either TX error, RX errors or some combination of the two over defined periods of time.

If a determination is made that the error limit is exceeded, control proceeds to a "Disable Offload" block 270. During processing associated with block 270, OLC 121 disables OLE 122 and sets an indication in network adapter 120 that indicates this configuration. Control then proceeds to Return to Adapter block 258 and processing continues as described above. If, during processing associated with block 268, a determination is made that the counter does not exceed the limit, control proceeds to block 258 and processing continues as described above.

Finally, process 250 is halted by means of an asynchronous interrupt 272, which passes control to an "End Operate OLC" block 279 in which process 250 is complete. Interrupt 272 is typically generated when the computing system 102. OS or network adapter 120 is halted. During normal operation, process 250 continuously loops through the blocks 254, 256, 258, 260, 262, 264, 266, 268 and 270, processing IPSec packets as they are received.

Figure 5:
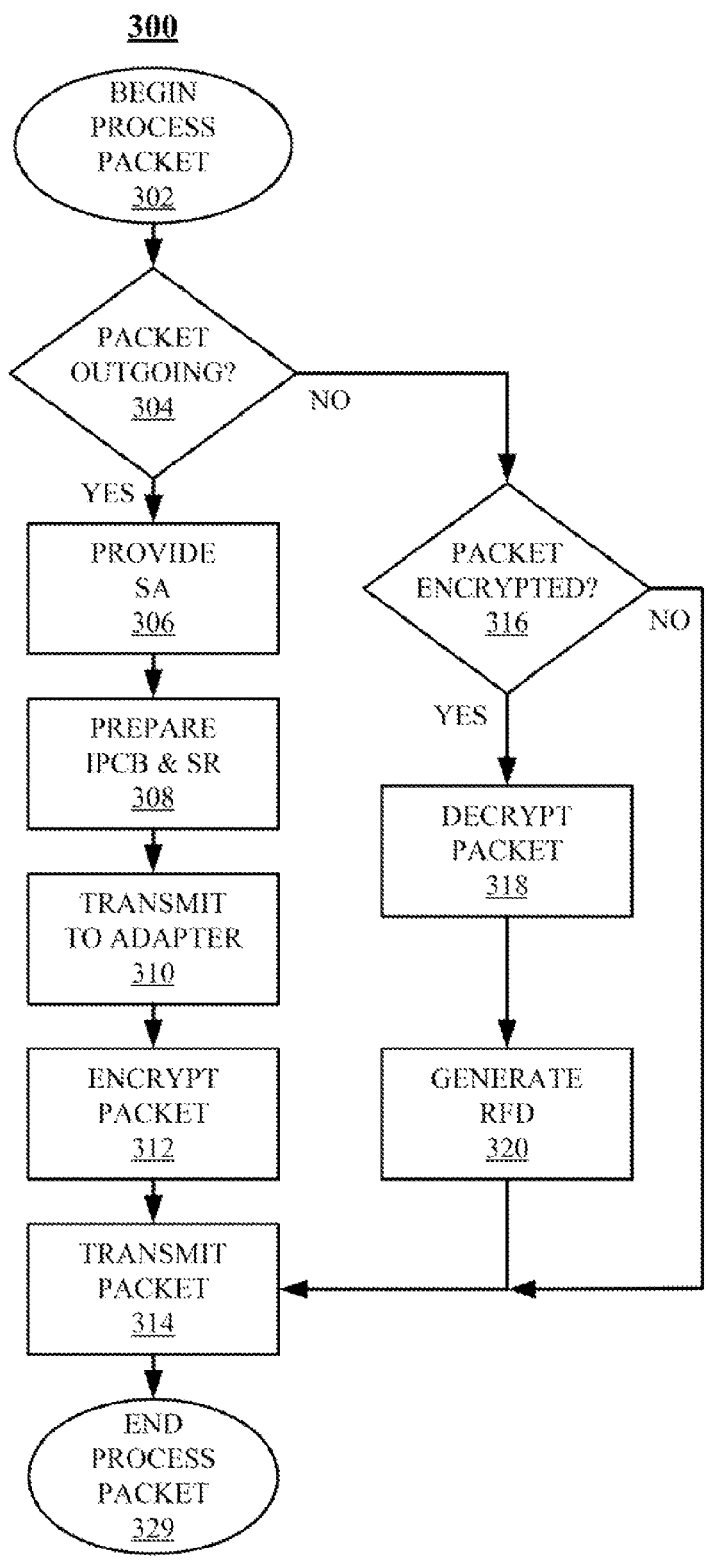
FIG. 5 is a flowchart of a Process Packet process that may implement aspects of the claimed subject matter.

FIG. 5 is a flowchart a Process Packet process 300 that may implement aspects of the claimed subject matter. Process 300 corresponds to Process Packet 260 (FIG. 4) and, like processes 200 and 250, is executed in conjunction with logic and memory associated with network adapter 120 (FIG. 1) OLC 121 (FIGS. 1 and 2) and OLE 122 (FIG. 1).

Process 300 starts in a "Begin Process Packet" block 302 and proceeds immediately to a "Packet Outgoing?" block 304. During processing associated with block 304, a determination is made as to whether or not the received packet (see 254, FIG. 4) is coming into computing system 102 or being transmitted from computing system 102. If the packet is outgoing, during processing associated with a "Provide Security Association (SA)" block 306, IPSM (FIG. 1) provides DD 118 (FIG. 1) with a SA in the mbuf of the packet. During processing associated with a "Prepare IP Command Block (IPCB) and Security Record (SR)" block 308, DD 118 prepares an IPCB and a SR structure that contains details about the security association to be applied to the packet. During processing associated with a "Transmit to Adapter" block 310. DD 118 transmits the packet, IPCB and SR to network adapter 120 (FIG. 1). During, processing associated with an "Encrypt Packet" block 312, network adapter 120 encrypts the packet, using the SR structure, prior to transmission. During processing associated with a "Transmit Packet" block 314, a transmission function of DD 118 is called, DD 118 determines whether or not the packet is an IPSec packet. If so, DD 118 sets an appropriate security bit in the IPCB to indicate that encryption should be performed on the fly. DD 118 also issues a command to inform network adapter 120 that a packet is ready for transmission. DD 118 checks the transmit status for any errors and provides a status on failed transmits packets for SA (see 150, FIG. 2).

If, during processing associated with block 304, a determination is made that the packet received is not an outgoing packet, i.e. an incoming packet, control proceeds to a "Packet Encrypted?" block 316. During processing associated with block 316, a determination is made as to whether or not the incoming packet is encrypted, typically by ascertaining whether or not the packet includes a SA. If so, during, processing associated with a "Decrypt Packet" block 318, network adapter 120 decrypts the packet prior to providing the packet to DD 118. During processing associated with a "Generate Receive Frame Structure (RFS) block 320, network adapter 120 provides a new structure called a Receive Frame Descriptor (RFD) structure that includes a field entitled "security status word," which reflects how adapter 120 has performed an IPSec operation on the packet. The RFD structure includes information such as, but not limited to, the status of a signature, DES and hash, any errors on ESP or AH protocol, an SA ID and SA match. IP security module 116 (FIG. 1) employs this information to verify the correct SA was used to decrypt the packet and whether or not the encrypted packet was decrypted by hardware or software. Based upon the security status word passed by adapter 120, DD 118 is also able to if an error has occurred in decrypting the received packet. Control then proceeds to Transmit Packet block 314 during processing associated with the packet is forwarded to its destination. Finally, control proceeds to an "End Process Packet" block 329 during which process 300 is complete.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described, in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block, in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method, comprising;
   receiving a packet transmitted in conjunction with a security association associated with Internet Protocol Security (IPSec);
   determining, based upon the security Association that the packet is faulty;
   incrementing a count corresponding to previous faulty packets received;
   determining that the count exceeds a threshold; and
   disabling IPSec accelerator hardware in response to the determining that the count exceeds the threshold.

2. The method of claim 1, further comprising enabling an IPSec software module for processing subsequent packets transmitted in conjunction with a security association associated with IPSec.

3. The method of claim 1, further comprising comparing the security association transmitted in conjunction with the packet with a second security association used to decrypt the packet to verify that the security association transmitted in conjunction with the packet is a correct security association.

4. The method of claim 1, wherein the packet is an outgoing packet with respect to a network adapter associated with a computing system.

5. The method of claim 1, wherein the packet is an incoming, packet with respect to a network adapter associated with a computing system.

6. The method of claim 1, wherein the threshold corresponds to a count of faulty packets over a defined period of time.

7. The method of claim 1, further comprising:
   enabling the IPSec accelerator hardware in response to a determination that a cause corresponding to a fault associated with the faulty packet is resolved; and
   disabling the IPSec accelerator software module in response to the enabling of the IPSec accelerator hardware.

* * * * *